R. L. TOLSON.
DIFFERENTIAL GEARING.
APPLICATION FILED FEB. 18, 1921.
1,437,692.
Patented Dec. 5, 1922.
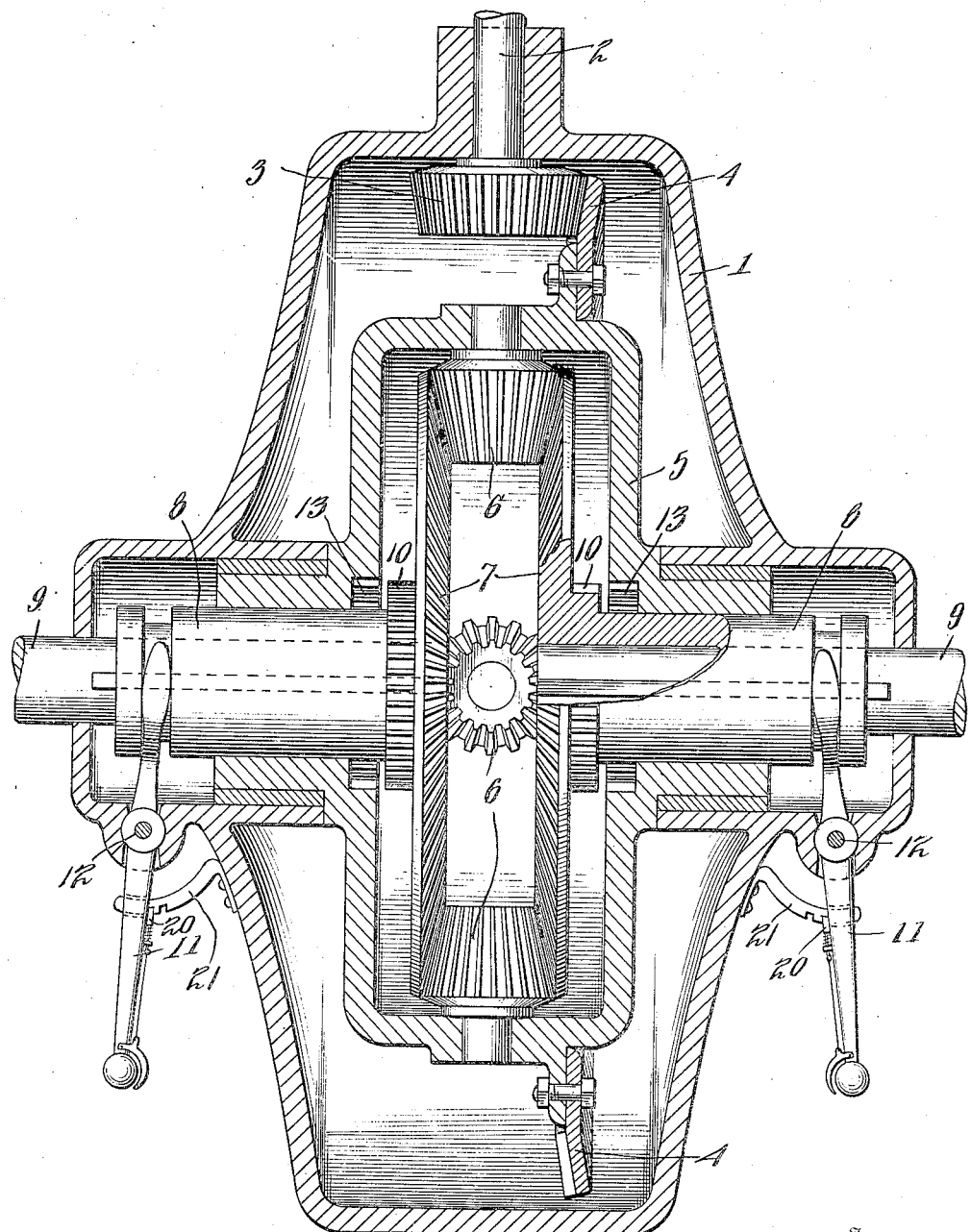
Inventor
Robert L. Tolson
By
Attorney Patented Dec. 5, 1922.

1,437,692

UNITED STATES PATENT OFFICE.

ROBERT LEE TOLSON, OF MEMPHIS, TENNESSEE, ASSIGNOR, BY MESNE ASSIGNMENTS, TO JOHN W. FARLEY, TRUSTEE, OF MEMPHIS, TENNESSEE.

DIFFERENTIAL GEARING.

Application filed February 18, 1921. Serial No. 445,942.

*To all whom it may concern:*

Be it known that I, ROBERT LEE TOLSON, a citizen of the United States, residing at Memphis, in the county of Shelby and State of Tennessee, have invented certain new and useful Improvements in Differential Gearing, of which the following is a specification.

My said invention relates to a differential gearing and it is an object thereof to provide differential mechanism in which one or both of the driven shafts may be positively driven from the driving shaft.

Referring to the accompanying drawing which is made a part hereof and on which similar reference characters indicate similar parts, The figure shows a horizontal central section of the device.

Reference character 1 indicates a differential casing of conventional form for the usual purpose. A pinion on a driving shaft 2 engages with a master gear 4 on the differential casing 5. This casing carries a series of pinions 6, 6 normally engaging gears 7, 7. Each of the gears 7, 7 has integral therewith a sleeve 8 surrounding a shaft of the divided axle 9 and splined thereto. An enlarged portion of each sleeve has gear teeth 10 formed thereon and each sleeve has also a groove engageable by a lever 11 pivoted at 12 on the gear casing and held in position by a pawl 20 and rack 21.

As shown in the drawing shaft 2, through the differential mechanism, may drive shafts 9, 9 in the usual fashion if desired. Alternately, either shaft 9 may be driven positively by actuating its lever 11 to move sleeve 8 to a position in which the teeth 10 will engage teeth 13 on the differential casing. It will be evident that when thus moved the gear 7 will be out of engagement with the pinions and will move in unison with the casing 5. Either or both gears may be thus driven positively to drive the shafts 9, 9 positively. The levers 11 are preferably held either in the position shown or in the opposite position where teeth 10 engage teeth 13, by means of a locking segment 14 having two notches for alternate engagement by a detent 15 on the lever 11.

If desired the gears 7 in the casing 5 could be so spaced as to afford an intermediate position in which neither set of teeth on a gear would be in engagement and no drive would be transmitted, a third notch being then provided on the segment 14. Other modifications will suggest themselves to those skilled in the art of power transmission and therefore I do not limit myself to what is shown in the drawings and described in the specification, but only as indicated by the appended claims.

Having thus fully described my said invention, what I claim as new and desire to secure by Letters Patent, is:

1. In a differential mechanism, a rotary casing having pinions therein, means for driving the casing, gears normally engaging the pinions and also adapted to engage the casing and means for independently disconnecting said gears from the pinions and engaging them with the casing, substantially as set forth.

2. In a differential gearing, a differential casing, means for driving the same, a divided axle, a sleeve splined on each axle member, pinions in the casing, gears fixed to said sleeves and engaging said pinions, said sleeves also having means adapted to engage positively with the casing and a shifting lever engaging each sleeve to disengage its gear from the pinions and engage the same positively with the casing, substantially as set forth.

3. In a differential gearing, a differential casing, a master gear thereon, a driving pinion engaging the same, a plurality of pinions inside the casing, a divided axle, a sleeve on each member thereof, gears integral with said sleeves and meshing with said pinions, said sleeves carrying teeth for positive engagement with teeth on the differential casing and levers for moving the sleeves on the axle members to disengage the gears from the pinions and to engage the teeth on the sleeves with those on the casing, substantially as set forth.

In witness whereof, I have hereunto set my hand and seal at Memphis, Tennessee, this 14th day of February, A. D nineteen hundred and twenty-one.

ROBERT LEE TOLSON. [L. S.]

Witnesses:
JOHN W. FARLEY,
F. M. BAILEY.